US009742825B2

(12) United States Patent
Will et al.

(10) Patent No.: US 9,742,825 B2
(45) Date of Patent: Aug. 22, 2017

(54) SYSTEMS AND METHODS FOR CONFIGURING DEVICES

(71) Applicant: Comcast Cable Communications, LLC, Philadelphia, PA (US)

(72) Inventors: Douglas Will, Parker, CO (US); Joshua Seiden, Englewood, CO (US); Thomas Day, Superior, CO (US); Derek Johnson, Sedalia, CO (US); Shawn Kercher, Parker, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 234 days.

(21) Appl. No.: 13/799,913

(22) Filed: Mar. 13, 2013

(65) Prior Publication Data
US 2014/0280741 A1    Sep. 18, 2014

(51) Int. Cl.
| | | |
|---|---|---|
| *G06F 15/16* | (2006.01) |
| *H04L 29/06* | (2006.01) |
| *H04L 12/24* | (2006.01) |
| *H04N 21/254* | (2011.01) |
| *H04N 21/462* | (2011.01) |
| *H04N 21/478* | (2011.01) |
| *H04N 21/845* | (2011.01) |
| *H04N 21/858* | (2011.01) |

(52) U.S. Cl.
CPC .......... *H04L 65/60* (2013.01); *H04L 41/0813* (2013.01); *H04L 65/4084* (2013.01); *H04N 21/2542* (2013.01); *H04N 21/4622* (2013.01); *H04N 21/47815* (2013.01); *H04N 21/8456* (2013.01); *H04N 21/8583* (2013.01)

(58) Field of Classification Search
CPC ... G06Q 30/02; H04L 29/08072; H04L 29/06; H04L 29/0809; H04L 29/08117; H04L 65/40; H04L 65/102; H04L 65/4084; H04L 63/0861; H04L 63/0876; G06F 17/30026; G06F 17/30787
USPC ................ 709/219; 725/31, 90, 135; 707/3, 707/E17.001; 386/83
See application file for complete search history.

(56) References Cited

U.S. PATENT DOCUMENTS

| | | | |
|---|---|---|---|
| 8,713,685 B2* | 4/2014 | Fahrny ......................... 380/200 |
| 2003/0021441 A1* | 1/2003 | Levy ..................... G10L 19/018 382/100 |
| 2003/0161473 A1* | 8/2003 | Fransdonk .............. G06F 21/10 380/277 |
| 2004/0220926 A1* | 11/2004 | Lamkin et al. .................... 707/3 |
| 2006/0156374 A1 | 7/2006 | Hu |
| 2006/0225138 A1* | 10/2006 | Toyohara ........... G06Q 30/0601 726/27 |
| 2008/0310722 A1 | 12/2008 | Daniels |
| 2009/0019553 A1* | 1/2009 | Narayanaswami ............. 726/28 |
| 2009/0141890 A1* | 6/2009 | Steenstra ........... G06Q 20/3272 380/44 |

(Continued)

Primary Examiner — Joseph E Avellino
Assistant Examiner — Patrick Ngankam
(74) Attorney, Agent, or Firm — Ballard Spahr LLP (57) ABSTRACT

Systems and methods for configuring devices are disclosed. One method can comprise receiving an output signal representing user rights relating to a requested data and processing the output signal to generate validation data. The method can also comprise transmitting the validation data to a source of the requested data, wherein the validation data facilitates the transmission of the requested data.

20 Claims, 9 Drawing Sheets

(56) References Cited

U.S. PATENT DOCUMENTS

| | | | |
|---|---|---|---|
| 2010/0119208 A1* | 5/2010 | Davis | H04N 5/765 386/291 |
| 2010/0222102 A1 | 9/2010 | Rodriguez | |
| 2011/0041154 A1* | 2/2011 | Olson | G06F 17/30787 725/54 |
| 2011/0085781 A1 | 4/2011 | Olson | |
| 2011/0171612 A1 | 7/2011 | Gelinske | |
| 2011/0289098 A1* | 11/2011 | Oztaskent | G06F 17/30026 707/769 |
| 2011/0289114 A1 | 11/2011 | Yu | |
| 2011/0289532 A1 | 11/2011 | Yu | |
| 2011/0314378 A1 | 12/2011 | Nijim | |
| 2014/0123170 A1* | 5/2014 | Kummer | 725/31 |

* cited by examiner

SYSTEMS AND METHODS FOR CONFIGURING DEVICES

BACKGROUND

Devices equipped for uni-directional communication do not have the capability to respond to received commands or to initiate communications with upstream devices. Uni-directional communication can limit the services that can be made available to a user. For example, such uni-directional devices do not support bi-directional services such as pay-per-view (PPV) services since uni-directional devices cannot report purchases. Similarly, uni-directional devices do not support video on demand (VOD), since the uni-directional devices cannot communication with the VOD servers. The present disclosure addresses these and other shortcomings relating to configuring devices.

SUMMARY

It is to be understood that both the following general description and the following detailed description are exemplary and explanatory only and are not restrictive, as claimed. Provided are methods and systems for configuring devices.

In an aspect, devices can be configured to provide services such as content related services. As an example, the systems and methods of the present disclosure can utilize unique signals (e.g., audio signals) transmitted from a device to transmit embedded information such as identification data, validation data, and configuration data relating to the device or user. Such information can be used to process user rights, provide services, or provide a personalized user experience, or a combination thereof. Such information can be used for other process relating to data delivery and authentication, for example.

In an aspect, methods can comprise receiving an audio signal representing user rights relating to requested data. The audio signal can be processed to generate validation data. The validation data can be transmitted to a source of the requested data. The validation data can facilitate the transmission of the requested data.

In an aspect, methods can comprise receiving a proxy request for data from a first device. First validation data relating to the requested data can be transmitted in response to receiving the proxy request. Second validation data can be received from the first device. The second validation data can be based upon the first validation data. The requested data can be transmitted to a second device based upon at least the proxy request.

In an aspect, methods can comprise receiving validation data at a device. The validation data can represent user rights relating to requested data such as data requested by a device or proxy of a device. The validation data can be modified to represent configurations of the device. A signal output such as audio can be generated based on the modified validation data. As an example, the validation data can be represented by the signal output. The generated signal output can be received and processed to extract the validation data.

In an aspect, methods can comprise receiving an output signal (e.g. audio) relating to requested data. The audio signal can be processed to generate an audio fingerprint. The audio fingerprint can be compared to one or more comparator elements to identify a matching comparator element. Validation data can be generated based upon the matching comparator element. The validation data can be transmitted to a device, wherein the validation data facilitates the personalization of a user experience.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a." "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, a system and network can be configured to a device. The validation data can represent user rights relating to requested data such as data requested by a device or proxy of a device. The validation data can be modified to represent configurations of the device. A signal output such as audio can be generated based on the modified validation data. As an example, the validation data can be represented by the signal output. The generated signal output can be received and processed to extract the validation data.

Figure 1:
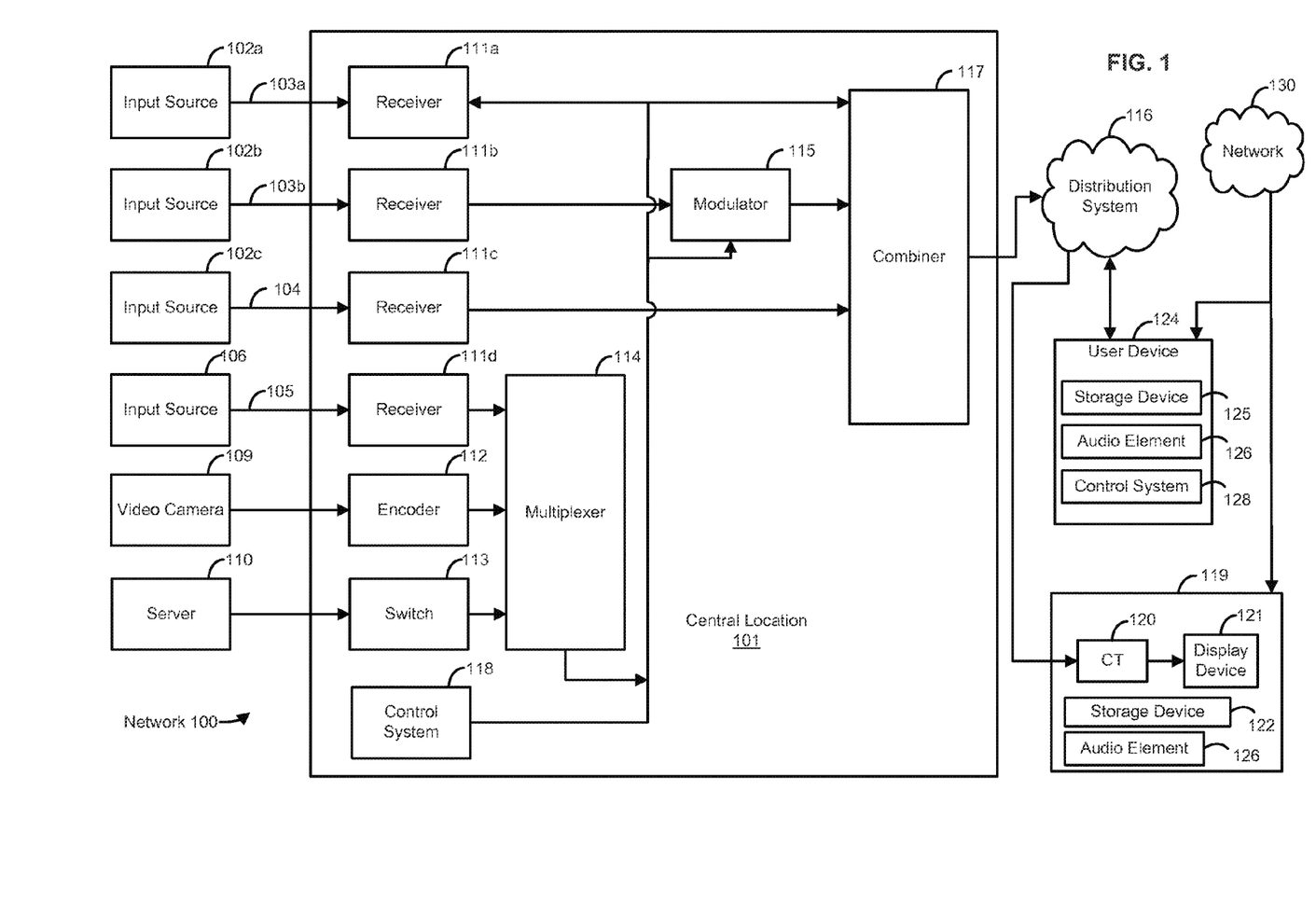
FIG. 1 is a block diagram of an exemplary network.

FIG. 1 illustrates various aspects of an exemplary network in which the present methods and systems can operate. The present disclosure relates to systems and methods for analyzing a device. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g. a control or processing facility in a fiber optic network, wireless network or satellite network, a hybrid-fiber coaxial (HFC) content distribution center, a processing center, headend, etc.), which can receive content (e.g., data, input programming, and the like) from multiple sources. The central location 101 can combine the content from the various sources and can distribute the content to user (e.g. subscriber) locations (e.g., location 119) via distribution system 116.

In an aspect, the central location 101 can create content or receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include, for example, a single content item or a multiplex that includes several content items. In an aspect, the central location 101 can create and/or receive application, such as interactive applications. Such applications can be related to particular content.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface comprising a decoder 120, such as a gateway or communications terminal (CT) can decode, if needed, the signals for display on a display device 121, such as on a television set (TV) or a computer monitor. Various wireless devices may also be connected to the network at, or proximate, user location 119. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's 120, display devices 121, central locations 101, DVR's, home theater PC's, and the like. As an example, a storage device 122 can be in communication with one or more of the CT 120, the display device 121, and the central location 101 to send/receive content there between. As a further example, the storage device 122 can be located remotely from the user location 119, such as network storage. In an aspect, a software such as operating software, control software, or application software can be stored on the storage device 122.

In an aspect, user location 119 is not fixed. By way of example, a user can receive content from the distribution system 116 on a mobile device such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be a CT, a set-top box, a television, a computer, a smartphone, a laptop, a tablet, a multimedia playback device, a portable electronic device, and the like. As an example, the user device 124 can be an Internet Protocol compatible device for receiving signals via a network 130 such as the Internet or some other communications network for providing content to the user. It is understood that other display devices and networks can be used. It is further understood that the user device 124 can be a widget or a virtual device for displaying content in a picture-in-picture environment such as on the display device 121, for example. As an example, a storage device 125 can be in communication with one or more of the user device 124 and the central location 101 to send/receive content there between. As a further example, the storage device 125 can be located remotely from the user device 124, such as a network storage medium. In an aspect, software such as operating software, control software, or application software can be stored on the storage device 125.

In an aspect, one or more of the CT 120, the user device 124, or other device or system can be in communication with an audio element 126. The audio element 126 can be software, or hardware, or a combination thereof. The audio element 126 can be disposed remotely from one or more of the CT 120 and/or the user device 124 and in communication with one or more devices. As an example, audio element 126 can be configured to receive an input (e.g., audio signals) such as signals representing sound output or other forms of output. As another example, the audio element 126 can be configured to transmit any output such as audible and inaudible sounds. As a further example, the audio element 126 can be integrated with one or more of the CT 120, the user device 124, or other device or system. In an aspect, the audio element 126 can be configured to transmit and/or receive audio signals embedded with information that can be extracted and processed. In another aspect, the audio element 126 can be configured as a transmit-only or receive only element.

In an aspect, one or more of the CT 120, the user device 124, or other device or system can be in communication with a control system 128 or device or element. The control system 128 can be disposed remotely from one or more of the CT 120 and/or the user device 124 and in communication with one or more devices. As an example, the control system 128 can comprise control software for managing one or more control functions and/or associated encoded control data. As a further example, the control system 128 can be integrated with one or more of the CT 120, the user device 124, or other device or system. In an aspect, the control system 128 can be configured to facilitate remote control of one or more of the CT 120 and the user device 124.

Figure 2:
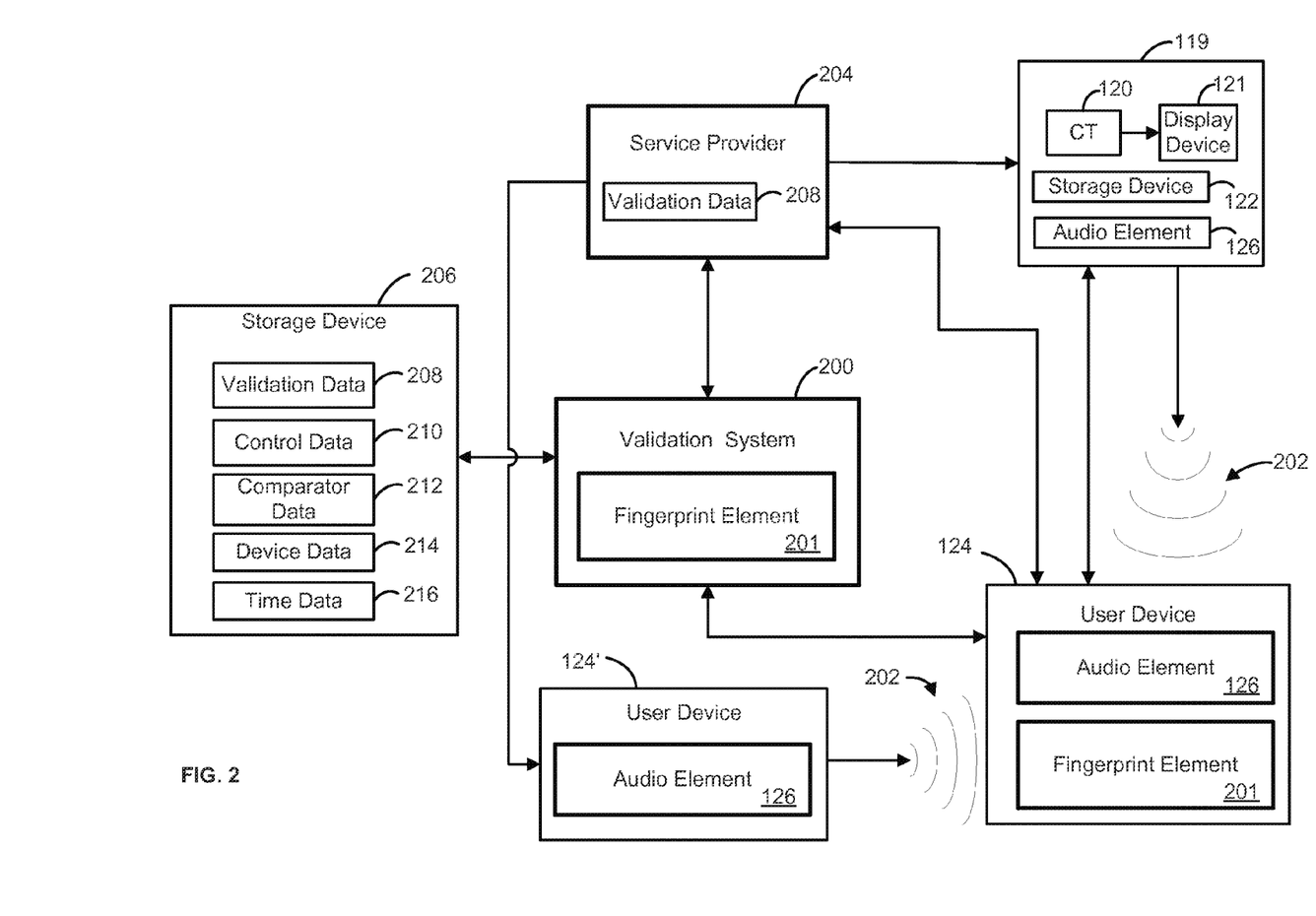
FIG. 2 is a block diagram on an exemplary system and network.

FIG. 2 illustrates various aspects of an exemplary system in which some of the disclosed methods and systems can operate. In an aspect, a validation system 200 may also be in communication with one or more devices such as one or more user devices 124, 124'. The validation system 200 can be disposed or otherwise implemented remotely from one or more of the CT 120 and/or the user device 124. As an example, the validation system 200 can be disposed in the central location 101. As a further example, the validation system 200 can be integrated into a device to manage device control features.

In an aspect, the validation system 200 can be disposed in a computing device. As an example, the validation system 200 can be a stand-alone system, or may be disposed in one of the CT 120, the user device 124, a set-top box, or a content receiver. As a further example, the validation system 200 can be configured to communicate (e.g., wired or wirelessly, uni-directionally or bi-directionally, over RF, IR, WiFi, Bluetooth, and/or other protocols or spectrums) with one or more audio elements 126.

In an aspect, a fingerprint element 201 can be in communication with one or more of the validation system 200 and one or more audio elements 126. As an example, the validation system 200 can comprise the fingerprint element 201. As a further example, the fingerprint element 201 can be disposed remotely from the validation system 200 and/or integrated with the user device 124.

In an aspect, the fingerprint element 201 can comprise software and/or hardware configured to provide multimedia fingerprinting, digital summary, and/or content asset identification. The fingerprint element 201 can be configured to determine the perceptual similarities between two multimedia objects. As an example, fingerprint element 201 can determine similarity and/or equality by comparing the associated fingerprints of multimedia objects rather than the objects themselves. In an aspect, the fingerprints of a number of multimedia objects, along with their associated meta-data (e.g. content source, title, and time stamp) can be stored in a storage device 206. The fingerprints can serve as an index to the meta-data. The meta-data of unidentified multimedia content are then retrieved by computing a fingerprint of the unidentified multimedia content and using the computed fingerprint as a query in storage device 206.

In an aspect, the validation system 200 can be in communication with the storage device 206 or storage medium. The storage device 206 can be disposed remotely from one or more of the CT 120, the user device 124, and validation system 200. For example, the storage device 206 can be located at central location 101, at a third-party location, and the like. As a further example, the storage device 206 can be integrated or disposed in one or more of the CT 120, the user device 124, and the validation system 200. In an aspect, the storage device 206 can be the same storage as storage device 122 or storage device 125.

In an aspect, the storage device 206 can comprise one or more of validation data 208, control data 210, comparator data 212, device data 212, and/or time data 210. Other data can be stored on and retrieved from the storage device 206.

In an aspect, the validation data 208 can comprise information relating to permissions and/or entitlements associated with a particular user and/or device. As an example, the validation data 208 can comprise information, such as subscription information, identification information, location information, and/or timing information relating to a particular user or user device. In an aspect, the validation data 208 can be associated with a source of the content. As a further example, the validation data 208 can have time stamps or markers associated therewith. The storage device 206 can store information relating to users, user preferences, and user devices and configurations.

In an aspect, the control data 210 can comprise information relating to characteristics and parameters associated with a particular controller and/or controllable functions of one or more devices. In an aspect, the control data 210 can comprise information relating to the buttons or user interface elements of a particular controller. As an example, when a user configures a tablet or touch screen device to operate as a remote controller, the control data can comprise information relating to the communication protocol(s) associated with the tablet and/or the user interface elements rendered on the tablet.

In an aspect, the comparator data 212 can comprise information relating to the stored fingerprints of media objects such as content presented via one or more of the CT 120 and the user device 124, 124'. As an example, the comparator data can comprise information relating to fingerprints of embedded audio verification signals. In an aspect, a database can comprise a plurality of audio fingerprints. As an example, the audio fingerprints can be collected from sampling downstream programming at a cable plant. As a further example, the stored audio fingerprints can be used as comparator elements for processing against unidentified audio fingerprints.

In an aspect, the device data 214 can comprise information relating to one or more controllable devices. As an example, the device data 204 can comprise information for one or more devices relating to manufacturer, model, series, version, device type, and the like. As a further example, the device data 214 can be associated with the comparator data 212 such that a particular device having a particular manufacturer may be associated with particular comparator data 212.

In an aspect, the time data 216 can be a time stamp or other time marker for indicating, for example, a date and/or time associated with one or more of a transmission of content, a request for content, a request for playback, storage of content, deletion of content, a request for encoding, encoded data updates, or the execution of a particular control function. As an example, the time data 216 can comprise any number of time-related entries and/or markers. As a further example, the time data 216 can comprise one or more of a table of time-related data entries, a timing log, and a database of time-related information. Other information can be stored as the timing data.

In an aspect, information embedded in audio can be recovered by the audio element 126 to be used to identify the device (e.g., CT 120, user device 124') that transmitted the audio. As an example, the embedded information can also comprise configuration information relating to the transmitting device. As a further example, the configuration information can comprise current tuned channel, software versions, user configurations and other data.

As an example, audio commands can be generated by upstream computing devices. The audio commands can be embedded into an audio stream for a particular downstream device (e.g., CT 120, user device 124'). Once the downstream device is tuned to the correct channel, the audio element 126 of device (e.g., user device 124) can detect the embedded audio commands and report back to the upstream device. In addition to the embedded audio commands, the downstream device can embed current configuration information that may be unique to the downstream device.

As a further example, a user can tune a downstream device (e.g., CT 120, user device 124') to a particular content channel. Such a channel may require validation prior to presenting content. Accordingly, the user can use a secondary device (e.g., user device 124) to request validation of the requested content. As an example, the request from the secondary device can be routed to a content source such as a service provider 204. As such, the content source can transmit validation information to the downstream device as an embedded audio signal. In an aspect, the validation information can be addressed to a particular downstream device. When the downstream device receives the validation data, the embedded audio signal can be processed to result in the downstream device presenting audio representing the validation data. The audio can be received by the secondary device via an audio element such as a microphone. The audio can be processed and communicated to the content source to confirm receipt of the validation data. By confirming receipt of the validation data, the secondary device can operate as a proxy for the downstream device to request and verify content and associated permissions for content. Once the content source receives confirmation of receipt of the validation data, the content source can transmit the requested content to the downstream device for presentation.

In an aspect, the user device 124 can be configured with the audio element 126. The user device 124 can also be configured to present a programming guide relating to content that can be requested for a content device such as the CT 120 or another user device 124'. As the content device presents content, the audio element 126 of the user device 124 can receive audio transmitted from the content device. As such, the audio element 126 can identify a current airing program, program advertisement for a program, or any reference to a specific program. As an example, the audio element 126 can use multimedia fingerprinting to identify the content being presented. Based upon the identification, the user device can present the user with content control options such as the ability to set a recording, program reminders, requesting supplemental information relating to the content, or other actions for a specific program being aired or referenced in an advertisement or other currently airing programming.

Figure 3:
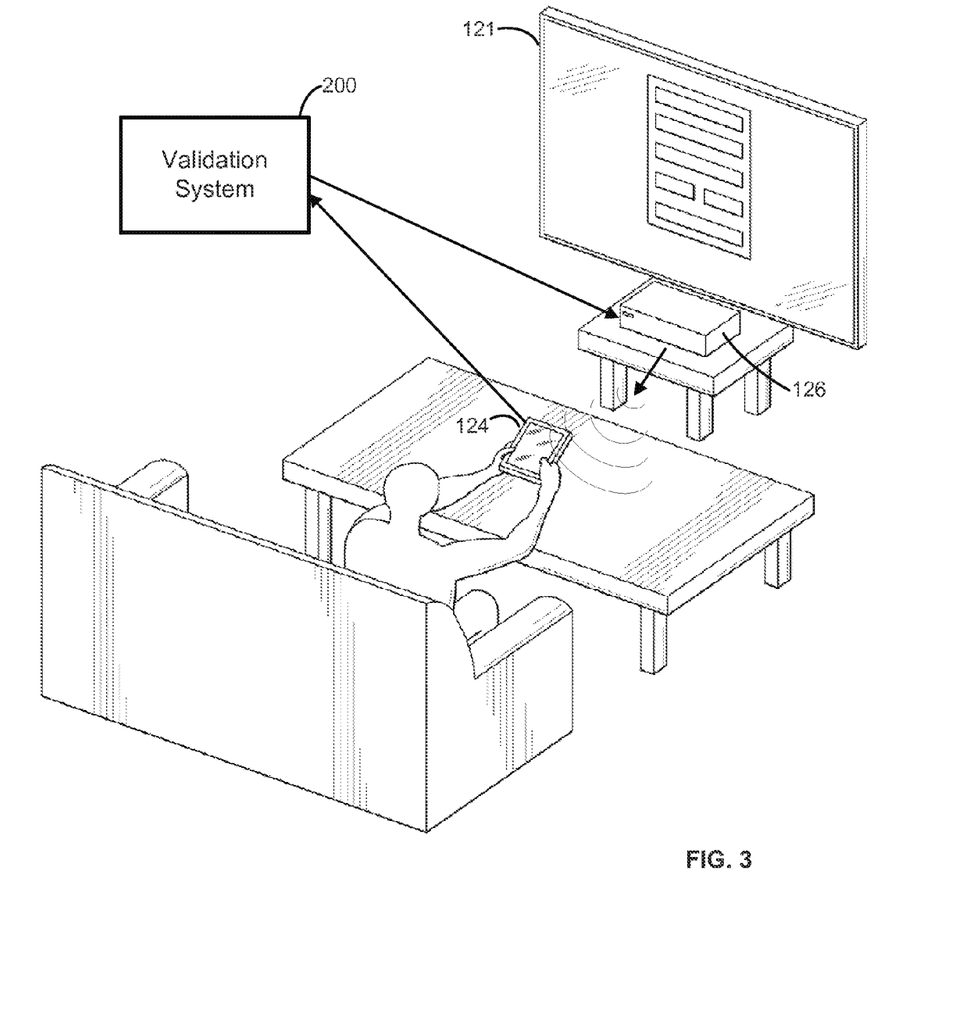
FIG. 3 is a perspective view of an exemplary user environment.

FIG. 3 illustrates an exemplary user environment in which the systems and methods can operate. In an aspect, the user device 124 can be disposed in proximity of a particular device, such as display 121. As such, the user device 124 can be configured to control content being presented via the display 121. In an aspect, one or more audio elements 126 can transmit information relating to the content presented (or requested for presentation). As an example, the user device 124 can be configured to receive the information transmitted from the one or more audio elements 126. In an aspect, information can be a sound output such as an audible or inaudible signal. Upon receipt of the information, the user device 124 can process the information can operate as a proxy of a device associated with the audio element 126. As an example, the user device 124 can interact with upstream devices to facilitate control of the content presented via the display 121 based upon the information received from the one or more audio elements 126. As a further example, the user device 124 can interact with upstream devices to effect configuration of one or more devices associated the display 121.

Figure 4:
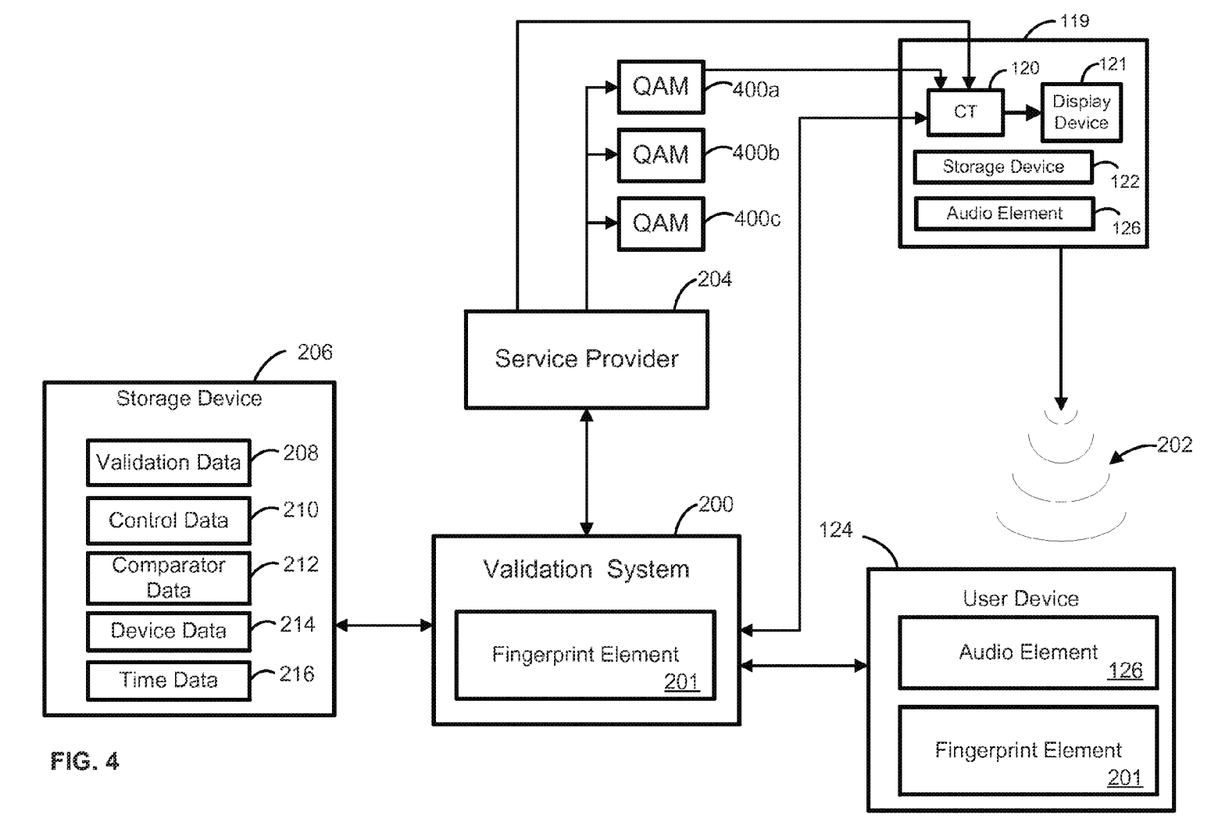
FIG. 4 is a block diagram of an exemplary control environment.

FIG. 4 illustrates an exemplary system comprising one or more computing devices and functionality similar to the system illustrated in FIG. 2. However, the systems of FIG. 2 and FIG. 4 can have any configuration of components and associated functionality. As an example, one or more computing devices such as the CT 120 can comprise or operate according to one or more protocols to command and control one or more content devices. In an aspect, the one or more protocols can be configured to remotely tune the one or more content devices. As an example, automatic content recognition (ACR) can be implemented (e.g., via user device 124) to determine content being presented via the one or more content devices. Accordingly, information relating to the determined content can be transmitted to an upstream device to control the data being transmitted downstream to the one or more content devices. In an aspect, a content source (e.g., service provider 204, VOD computing device, etc.) can transmit content (e.g., VOD files) to a transmitting device (e.g., streamer) to be transmitted (e.g., streamed) to a quadrature amplitude modulation (QAM) channel 400a, 400b, 400c and/or device or over another channel of communication such as end-to-end IP delivery. As an example, the one or more computing devices can be automatically tuned to one or more of the QAM channels 400a, 400b, 400c to receive the content transmitted via the QAM channel 400a, 400b, 400c.

In an aspect, ACR functionality can be used to determine which of a plurality of channels 400a, 400b, 400c, (e.g., QAM channels) is being consumed at a particular device such as CT 120. Once the channel 400a, 400b, 400c is determined, embedded commands can be sent in the video (or audio) to the device to be processed. In another aspect, a user can select, via a mobile device (e.g., user device 124), a particular asset to watch via the CT 120. As such, the user device 124 can be configured to receive audio from the CT 120 in order to determine what channel 400a, 400b, 400c the CT 120 is decoding. The determined channel 400a can be located and a command can be transmitted to the CT 120 to tune to a new 400c. The asset selected by the user, via the user device 124, can be transmitted over the new 400c to the CT 120. In a further aspect, web services and controls can be implemented in a similar manner to allow control of a computing device from a mobile device. As an example, ACR or other recognition techniques can be used to determine which of a plurality of data sources is providing an end-to-end IP delivery of data to a device (e.g., CT 120, user device 124). As such, information, such as requests or commands, can be sent to the determined data source to control data being transmitted to the device.

Figure 5:
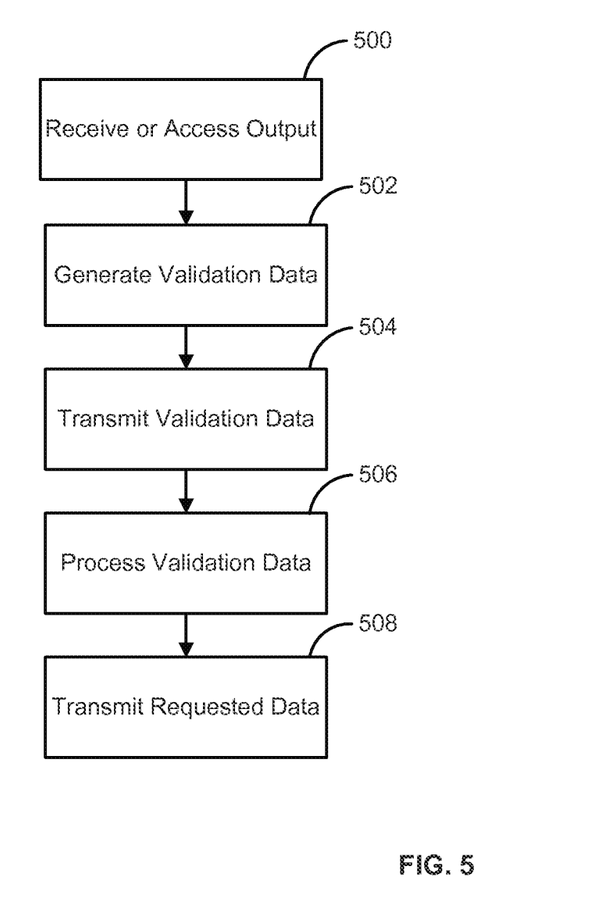
FIG. 5 is a flow chart of an exemplary method.

FIG. 5 illustrates an exemplary method for processing user rights. In step 500, an output such as an audio signal can be accessed or received. As an example, the audio signal can represent user rights relating to requested data. As a further example, the requested data can comprise one or more of a data service, a pay-per-view data, a video-on-demand data, and an interactive data. The audio signal can comprise a data packet, a waveform or waveforms, or other mechanism to convey information. As an example, the audio signal can represent audible output. However, other output and information can be represented by the audio signal, including inaudible output such as inaudible sound, images, video, and other output signals.

In step 502, the audio signal can be processed to generate validation data. In an aspect, the validation data can comprise information relating to permissions and/or entitlements associated with a particular user and/or device. As an example, the validation data can comprise information, such as subscription information, identification information, location information, and/or timing information relating to a particular user or user device. In an aspect, the validation data can be associated with a source of the content. As a further example, the validation data can have time stamps or markers associated therewith.

In another aspect, the audio signal can comprise configuration information and/or commands. As an example, the configuration information can be embedded in the audio signal. As a further example, the configuration information can relate to the device transmitting the audio signal. In an aspect, the control data can comprise information relating to characteristics and parameters associated with a particular controller and/or controllable functions of one or more devices. In an aspect, the control data can comprise information relating to the buttons or user interface elements of a particular controller. As an example, when a user configures a tablet or touch screen device to operate as a remote controller, the control data can comprise information relating to the communication protocol(s) associated with the tablet and/or the user interface elements rendered on the tablet.

In another aspect, processing the audio signal can comprise generating an audio fingerprint of the audio signal. An audio fingerprint can be a digital summary of the audio signal such as an identifier. In another aspect, processing the audio signal can comprise comparing the audio signal to a comparator element. As an example, a fingerprint of previously identified information (e.g., audio) can be used as a comparator element. As another example, fingerprints stored in a database can comprise waveforms captured and/or generated at a central location (e.g., a data processing facility of a content source or provider) where the channel associated with the waveform is known. As such, when a generated waveform is found to match a stored waveform, the channel associated with the stored waveform can then be associated with the generated waveform. In another aspect, processing the audio can comprise comparing the audio to a comparator element. In a further aspect, processing the audio can comprise converting the audio. In a further aspect, processing the audio signal can comprise converting the audio signal for additional processing or output.

In step 504, the validation data can be transmitted to a source of the requested data. As an example, the source of the requested data can comprise a service provider (e.g., content provider), distribution network, PPV computing device, VOD computing device, or the like. In an aspect, the validation data can facilitate the transmission of the requested data.

In step 506, the validation data can be processed. In an aspect, the validation data can be processed to determine whether a particular device and/or user has the user rights to receive the requested data. In the event the particular device and/or user does not have the user rights to receive the requested data, the requested data may not be delivered. Options regarding authorized receipt of the requested data can be presented to the user, such as an option to purchase additional user rights.

In step 508, the requested data can be transmitted to one or more devices. In an aspect, the requested data can be transmitted in response to receiving the validation data. As an example, when a source of the requested data receives the validation data and/or processes the validation data, the requested data can be transmitted to the one or more devices. The requested data can comprise, for example, content, PPV content, VOD content, and/or specially authorized information.

Figure 6:
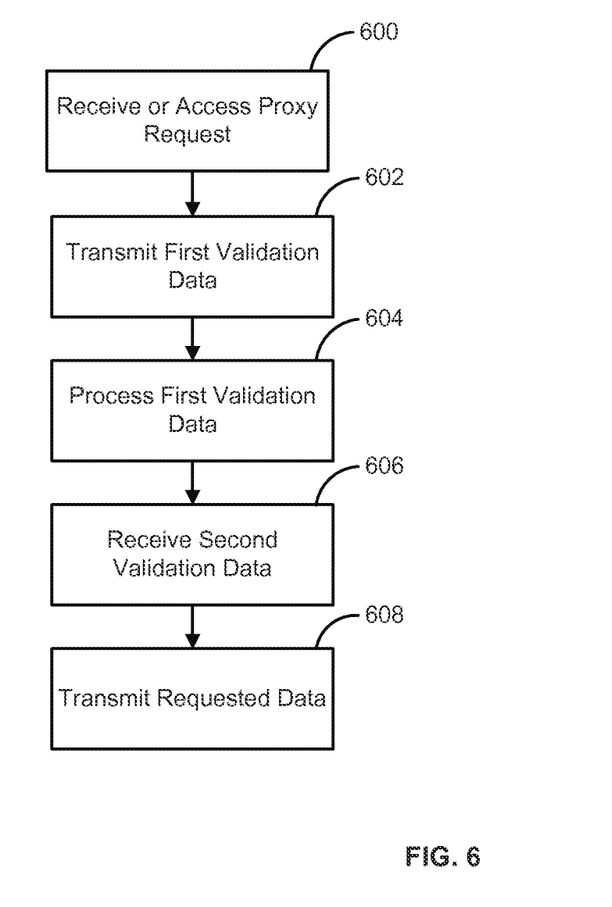
FIG. 6 is a flow chart of an exemplary method.

FIG. 6 illustrates an exemplary method for providing services. In step 600, a proxy request for data can be received from a first device. In an aspect, the proxy request can comprise a request received from the first device on behalf of a second device. As an example, the proxy request can comprise a request for one or more of a data service, linear data, a pay-per-view data, a video-on-demand data, and an interactive data. As a further example, the first device can comprise a user device configured to receive audio signals. In an aspect, the second device can be decoder, CT, and/or a uni-direction computing device, whereby the first device can supplement the native functionality of the second device.

In step 602, first validation data can be transmitted. In an aspect, the first validation data can relate to the requested data. As an example, the first validation data can comprise an embedded audio signal. As another example, the first validation data can comprise embedded configuration commands. As a further example, the first validation data can be transmitted to the second device.

In step 604, the first validation data can be processed. In an aspect, the first validation data can be received by the second device and transmitted by the second device as an output such as audio. Other outputs can be transmitted. In an aspect, the output is audible sound such as a tone, a sequence of tones, or the like. As an example, the first validation data can be converted into audio. As an example, the first validation data can be embedded as audio for receipt by a device configured for ACR, such as the first device.

In step 606, second validation data can be received from the first device. In an aspect, the second validation data can be based upon the first validation data. As an example, the second validation data can be generated from processing of the first validation data. Accordingly, the first device can receive the audio, process the audio, and generate the second validation data based upon the received audio. The generated second validation data can be transmitted upstream as a confirmation of receipt of the first validation data.

In step 608, the requested data can be transmitted to a second device. In an aspect, the requested data can be transmitted in response to receiving the second validation data. As an example, the first device can confirm receipt of the first validation data by transmitting the second validation data to a source of the requested data. The source can be any information source such as a central location, content source, service provider device, or the like, for example. As such, when the source of the requested data receives the second validation data, the requested data can be transmitted to the second device.

Figure 7:
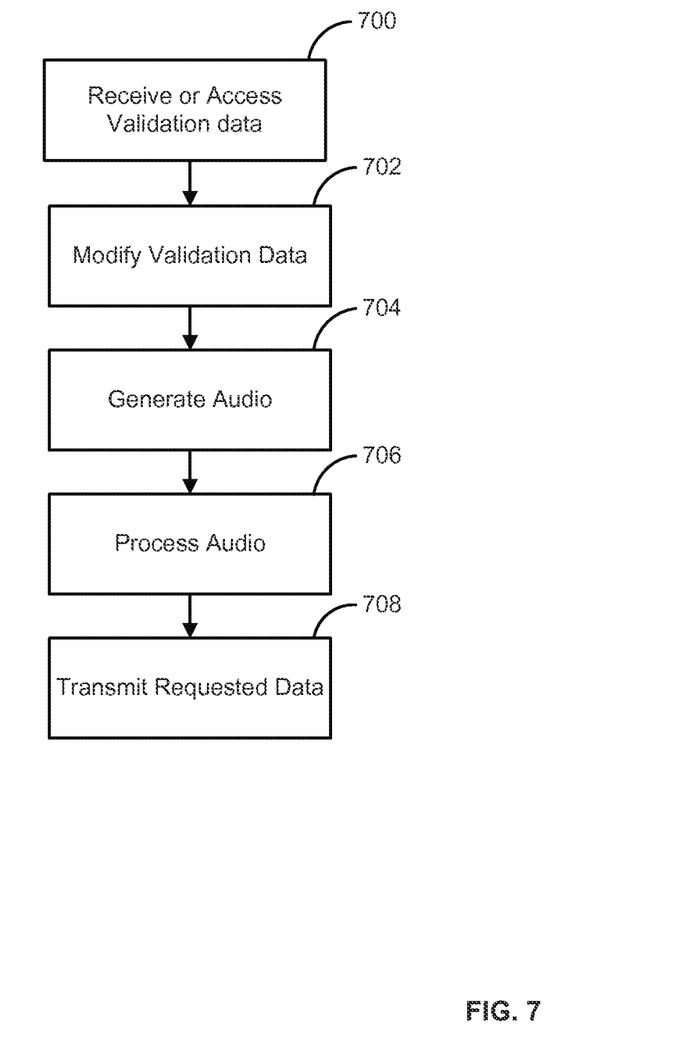
FIG. 7 is a flow chart of an exemplary method.

FIG. 7 illustrates an exemplary method for providing services. In step 700, validation data can be accessed or received at a device. In an aspect, the validation data can represent user rights relating to proxy requested data. As an example, the validation data can comprise an embedded audio signal. The embedded audio signal can comprise information relating to an output such as audio as well as supplemental information such as command data, configuration data, validation data, and other data or information embedded in the same transmission as the output information. As a further example, the proxy requested data can comprises one or more of a data service, a pay-per-view data, linear data, a video-on-demand data, and an interactive data.

In step 702, the validation data can be modified to represent configurations of the device. In an aspect, particular configuration and/or capabilities of the device can be embedded and/or encoded in the validation data. As an example, certain devices have a defined set of operational parameters and capabilities. As such, a representation of one or more of the device-specific parameters can be included in the validation data resulting in the modified validation data.

In step 704, an output such as audio can be generated based on the modified validation data. In an aspect, the modified validation data can be converted into an audio output. As an example, the modified validation data can be embedded as audible sound for receipt by a device configured for ACR. Other outputs can be used and processed similarly to ACR.

In step 706, the generated audio can be received and processed. In an aspect, processing the audio can comprise generating an audio fingerprint of the received audio. The audio fingerprint can be a digital summary such as a waveform. As an example, a waveform of the audio can be generated and compared to waveforms stored in a database. As another example, the waveforms stored in the database can comprise waveforms captured and/or generated at a central location (e.g. content processing or storage facility, cable plant, etc.) where the channel associated with the waveform is known. As such, when a generated waveform is found to match a stored waveform, the channel associated with the stored waveform can then be associated with the generated waveform. In another aspect, processing the audio can comprise comparing the audio to a comparator element. In a further aspect, processing the audio can comprise converting the audio. In step 708, the proxy requested data can be received in response to processing of the generated audio.

Figure 8:
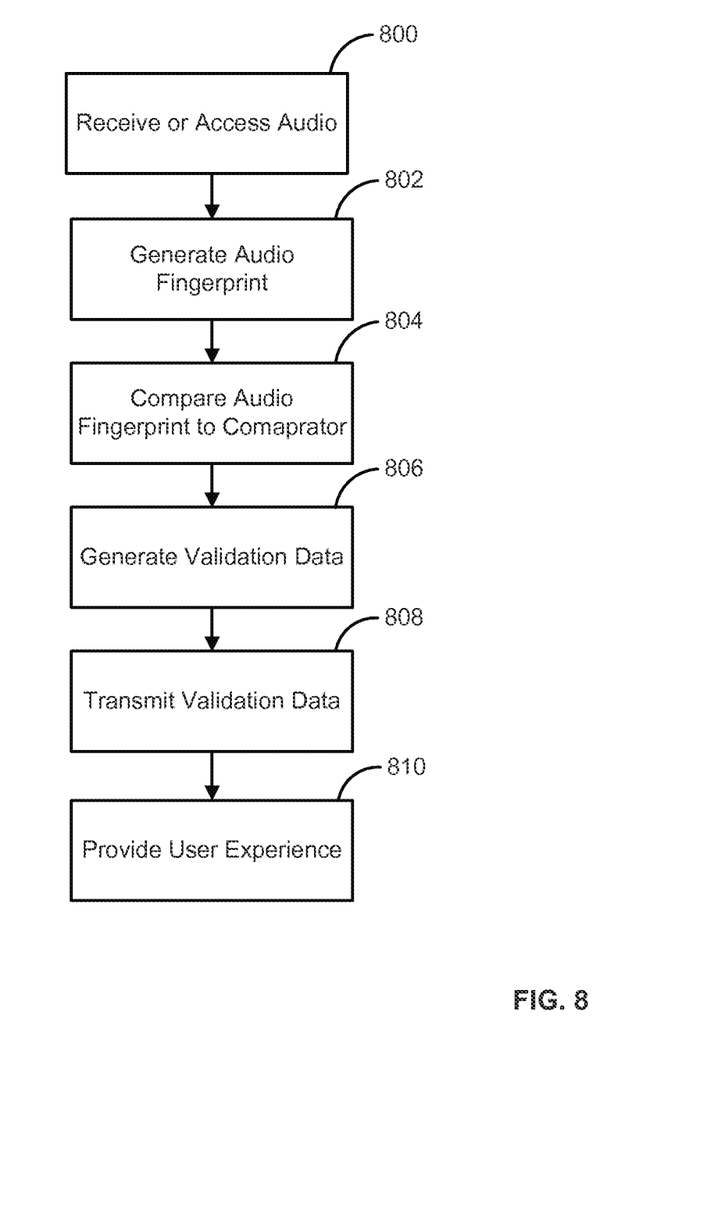
FIG. 8 is a flow chart of an exemplary method.

FIG. 8, illustrates an exemplary method for providing a user experience. In step 800, an audio signal can be received. In an aspect, the audio signal relates to a requested data. As an example, the audio signal can represent user rights relating to a requested data. As a further example, the requested data can comprises one or more of content a data service, a pay-per-view data, a video-on-demand data, and an interactive data. In another aspect, a computing devices such as a second screen device can receive an output (e.g., audio signal) from a device presenting content.

In step 802, the audio signal can be processed to generate an audio fingerprint. In an aspect, the audio fingerprint can be processed to track an output of a device such as a decoder, CT, display, user device, or the like. In an aspect, the validation data can be used to improve recommendation engines, search engines, etc. As an example, information (e.g., interface, content guide, etc.) presented via a second screen device can be updated and/or synchronized with an output of a primary device based upon the received output (e.g., fingerprint) of the primary device.

In step 804, the audio fingerprint can be compared to one or more comparator elements to identify a matching comparator element. As an example, a fingerprint of previously identified information (e.g., audio) can be used as a comparator element. As another example, fingerprints stored in a database can comprise waveforms captured and/or generated at a central location (e.g., cable plant) where the channel associated with the waveform is known. As such, when a generated waveform is found to match a stored waveform, the channel associated with the stored waveform can then be associated with the generated waveform.

In step 806, validation data can be generated based upon matching the comparator element. In an aspect, the validation data can comprise information relating to one or more of user rights, current airing content, content recording configurations, and time-shifted programming configurations.

In step 808, the validation data can be transmitted to a device. In an aspect, the validation data can facilitate the personalization of a user experience, at step 810. As an example, the validation data can be used to determine the content that the device is permitted to receive. As another example, the validation data can be used to control preferences for a particular user associated with the device As yet another example, configurations relating to the device and comprised by the validation data can be processed to provide optimization of device resources. As a further example, personalization of a user experience can comprise optimizing resources.

In an aspect, fingerprinting data can also be used to set recordings and or program reminders (based on audio fingerprint) and suggest similar content. In an example, software running on a computing device such as a second screen device, smart phone, tablet, PC or any other device with audio recognition software can receive or access an audio track presented via a primary device (e.g., decoder, CT, display, user device, etc.). The audio track can be fingerprinted and content associated with the audio track can be identified, for example, by comparison with stored and previously identified fingerprints. Once identified, various options such as programming reminders, recording options, supplemental information options, and/or content guide presentation, associated with the content can be presented to a user. Other options can be presented and/or executed based upon the received output of a particular device.

Figure 9:
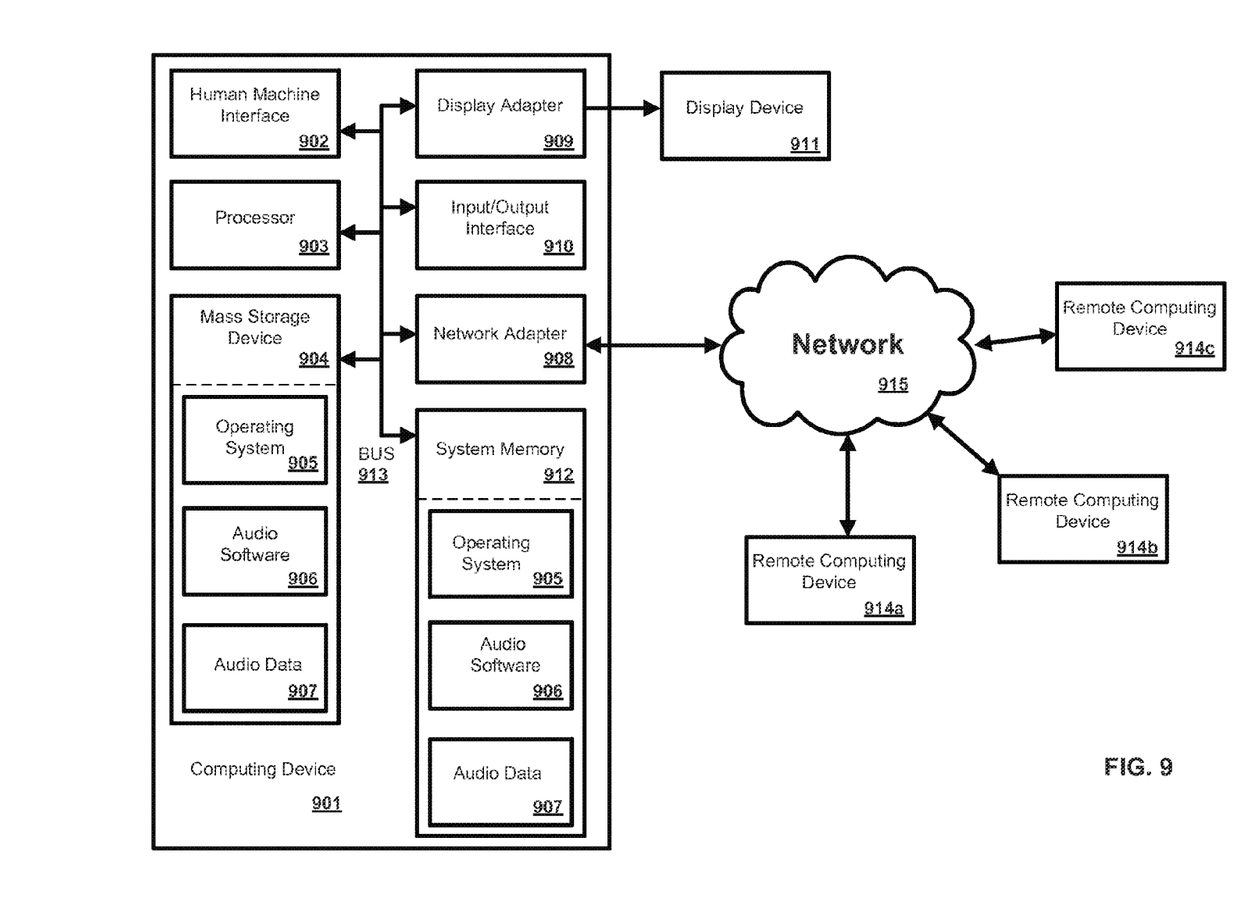
FIG. 9 is a block diagram of an exemplary computing device.

In an exemplary aspect, the methods and systems can be implemented on a computing system such as computing device 901 as illustrated in FIG. 9 and described below. By way of example, one or more of the CT 120, the user device 124, and the control system 126 of FIGS. 1-2 can comprise a computing device as illustrated in FIG. 9. Similarly, the methods and systems disclosed can utilize one or more computers to perform one or more functions in one or more locations. FIG. 9 is a block diagram illustrating an exemplary operating environment for performing the disclosed methods. One skilled in the art will appreciate that this is a functional description and that the respective functions can be performed by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors or processing units 903, a system memory 912, and a system bus 913 that couples various system components including the processor 903 to the system memory 912. In the case of multiple processing units 903, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and each of the subsystems, including the processor 903, a mass storage device 904, an operating system 905, control software 906, control data 907, a network adapter 908, system memory 912, an Input/Output Interface 910, a display adapter 909, a display device 911, and a human machine interface 902, can be contained within one or more remote computing devices 914*a,b,c* at physically separate locations, connected through buses of this form, in effect implementing a fully distributed system.

The computing device 901 typically comprises a variety of computer readable media. Exemplary readable media can be any available media that is accessible by the computing device 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as control data 907 and/or program modules such as operating system 905 and control software 906 that are immediately accessible to and/or are presently operated on by the processing unit 903.

In another aspect, the computing device 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computing device 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and control software 906. Each of the operating system 905 and control software 906 (or some combination thereof) can comprise elements of the programming and the control software 906. Control data 907 can also be stored on the mass storage device 904. Control data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 901 via an input device (not shown). Examples of such input devices comprise, but are not limited to, a keyboard, pointing device (e.g., a "mouse"), a microphone, a joystick, a scanner, visual systems such as Microsoft's Kinect, audio systems that process sound such as music or speech, a traditional silver remote control, tactile input devices such as gloves, touch-responsive screen, body coverings, and the like These and other input devices can be connected to the processing unit 903 via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, a display device 911 can also be connected to the system bus 913 via an interface, such as a display adapter 909. It is contemplated that the computer 901 can have more than one display adapter 909 and the computing device 901 can have more than one display device 911. For example, a display device can be a monitor, an LCD (Liquid Crystal Display), or a projector. In addition to the display device 911, other output peripheral devices can comprise components such as speakers (not shown) and a printer (not shown) which can be connected to the computing device 901 via Input/Output Interface 910. Any step and/or result of the methods can be output in any form to an output device. Such output can be any form of visual representation, including, but not limited to, textual, graphical, animation, audio, tactile, and the like. The display 911 and computing device 901 can be part of one device, or separate devices.

The computing device 901 can operate in a networked environment using logical connections to one or more remote computing devices 914*a,b,c*. By way of example, a remote computing device can be a personal computer, portable computer, a smartphone, a server, a router, a network computer, a peer device or other common network node, and so on. Logical connections between the computing device 901 and a remote computing device 914*a,b,c* can be made via a network 915, such as a local area network (LAN) and a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet. Furthermore, the computing device 901 can communicate information to one or more of the remote computing devices 914*a,b,c* for data analysis, pattern recognition, and control encoding, for example. In an aspect, the control system 916 can communicate information to one or more of the remote computing devices 914*a,b,c* (e.g., data center) for one or more of analyzing the alert to determine an appropriate response, aggregating a plurality of received alerts, and filtering a plurality of received alerts.

For purposes of illustration, application programs and other executable program components such as the operating system 905 are illustrated herein as discrete blocks, although it is recognized that such programs and components reside at various times in different storage components of the computing device 901, and are executed by the data processor(s) of the computer. An implementation of control software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology. CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In an aspect, systems and methods of the present disclosure can comprise an algorithm or other technique to determine the severity of the event and to notify appropriate personnel to investigate accordingly. As an example, an algorithm can evaluate the event based on severity and can assign a high, medium, or low designation.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
transmitting, from a first user device to a validation system, a request to transmit data to a second user device, wherein the second user device is uni-directional relative to both the validation system and a source of the data associated with the validation system;
receiving, by the first user device via a microphone, an audio signal representing user rights relating to the data from the second user device;
processing the audio signal, by the first user device, to generate validation data; and
transmitting, by the first user device, the validation data to the validation system, wherein the validation data authorizes the transmission of the data to the second user device by the source of the data, and wherein the source of the data comprises a content source.

2. The method of claim 1, wherein the data comprises one or more of a data service, pay-per-view data, video-on-demand data, or interactive data.

3. The method of claim 1, wherein the source of the data comprises a content provider.

4. The method of claim 1, wherein the source of the data comprises a distribution network.

5. The method of claim 1, wherein the source of the data comprises a pay-per-view server.

6. The method of claim 1, wherein the source of the data comprises a video-on-demand server.

7. The method of claim 1, wherein the audio signal comprises embedded configuration commands.

8. The method of claim 1, wherein processing the audio signal comprises generating a fingerprint of the audio signal.

9. The method of claim 1, wherein processing the audio signal comprises comparing the audio signal to a comparator element.

10. The method of claim 1, wherein processing the audio signal comprises converting the audio signal.

11. A method comprising:
receiving, by a content source from a first user device, a request to transmit data to a second user device, wherein the second user device is uni-directional relative to the content source;
transmitting, by the content source, first validation data relating to the data to the second user device, wherein the second user device transmits the first validation data as an audio output to the first user device, and wherein the first user device receives the first validation data via a microphone;
receiving, by the content source, second validation data from the first user device, wherein the second validation data is based upon the first validation data; and
transmitting, by the content source, the data to the second user device.

12. The method of claim 11, wherein the request comprises a request for one or more of a data service, pay-per-view data, video-on-demand data, or interactive data.

13. The method of claim 11, wherein the request comprises a request received from the first user device on behalf of the second user device.

14. The method of claim 11, wherein the first validation data comprises an embedded audio signal.

15. The method of claim 11, wherein the first validation data comprises embedded configuration commands.

16. A method comprising:
receiving, at a first user device from a second user device, an audio signal relating to data requested for transmission to the second user device, wherein the second user device is uni-directional relative to a content source of the data, and wherein the first user device and the second user device are at a same location;
processing the audio signal to generate an audio fingerprint;
comparing the audio fingerprint to one or more comparator elements to identify a matching comparator element;
generating validation data based upon the matching comparator element; and
transmitting the validation data to the content source of the data, wherein the content source transmits the validation data to the second user device, wherein the validation data facilitates a personalization of a user experience.

17. The method of claim 16, wherein the data comprises one or more of a data service, pay-per-view data, video-on-demand data, or interactive data.

18. The method of claim 16, wherein the audio signal comprises embedded configuration commands.

19. The method of claim 16, wherein the validation data comprises information relating to one or more of user rights, current airing content, content recording configurations, time-shifted programming configurations.

20. The method of claim 18, wherein the embedded configuration commands relate to an optimization of resources of the second user device.

* * * * *